May 16, 1950 P. KANE ET AL 2,507,719
WINDROW HARVESTER
Filed June 16, 1945 2 Sheets-Sheet 1
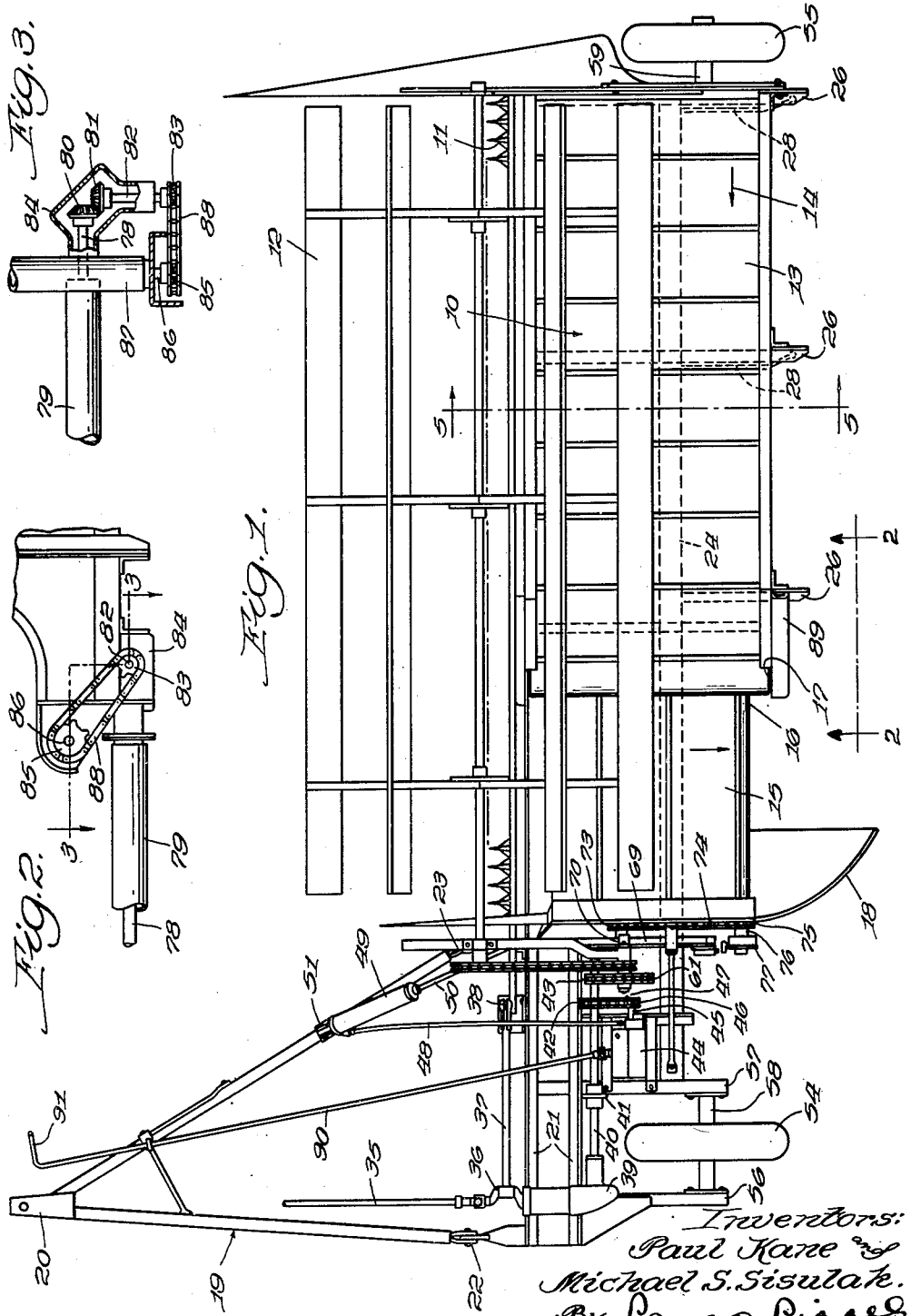

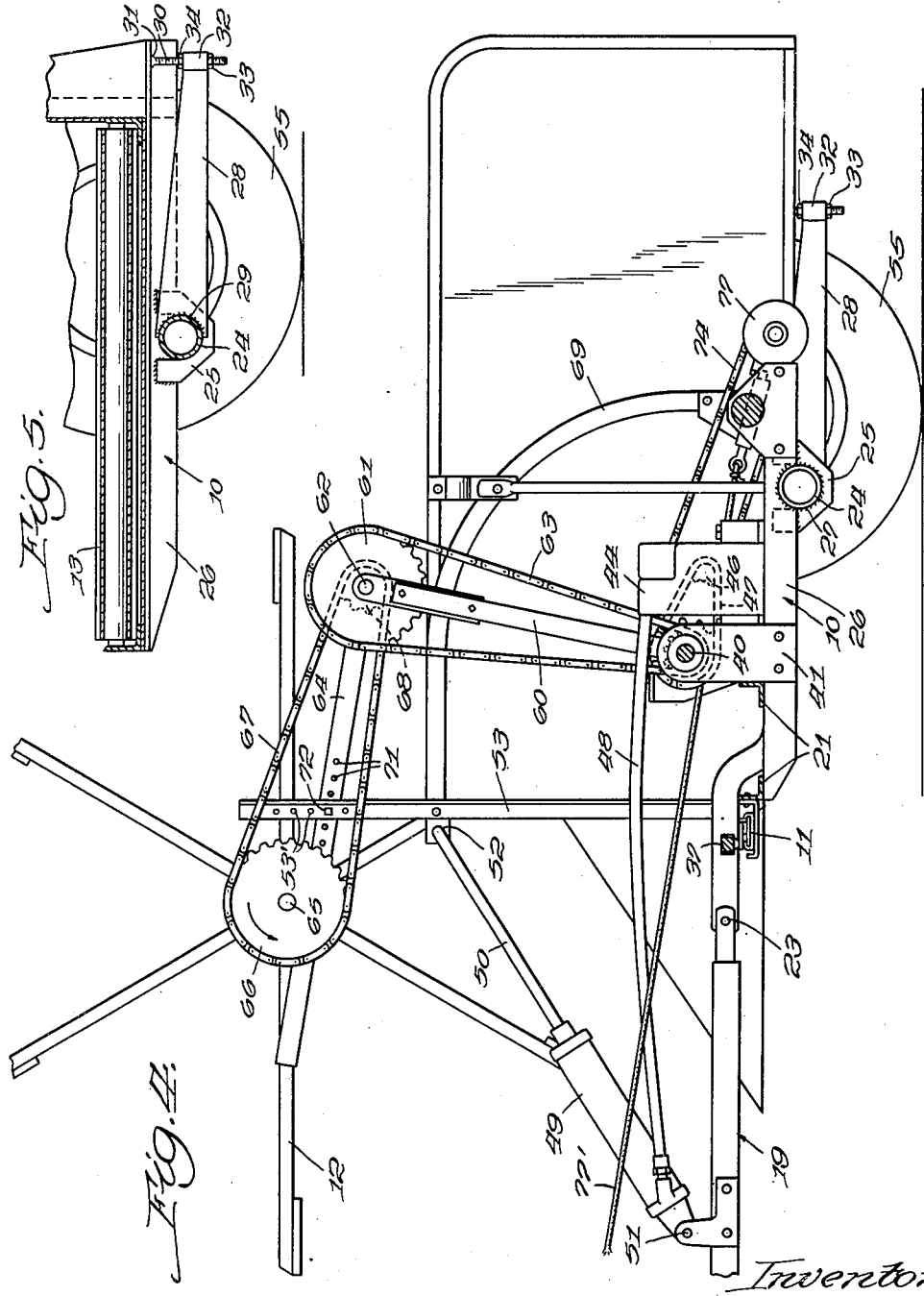

Patented May 16, 1950

2,507,719

UNITED STATES PATENT OFFICE 2,507,719

WINDROW HARVESTER

Paul Kane and Michael S. Sisulak, Chicago, Ill., assignors to International Harvester Company, a corporation of New Jersey Application June 16, 1945, Serial No. 599,858

1 Claim. (Cl. 56—23)

This invention relates to a new and improved windrow harvester and has for one of its principal objects the provision of means whereby the harvester platform is balanced about a torsion tube which is carried by a pair of wheels at the ends of the platform and positioned between the front and rear sides of the platform.

An important object of this invention is to provide a windrow harvester having its platform equipped with a transversely running apron adapted to feed cut crops to a longitudinally running apron positioned at the discharge end of the transverse conveyor and in which the discharge of the longitudinally running conveyor is at a point forwardly of the rear edge of the transversely running conveyor.

Another important object of this invention is to provide a tractor trailing windrow harvester capable of having its platform angularly adjusted by reason of a fluid pump mounted with the platform and securing its driving power from the tractor power take-off.

Other and further important objects of this invention will become apparent from the disclosures in the following specification and accompanying drawings, in which:

Figure 1 is a top plan view of the windrow harvester of this invention;

Figure 2 is a partial rear view with parts removed of a portion of the windrow harvester as shown in Figure 1 and indicated by the line 2—2;

Figure 3 is a sectional view taken on the line 3—3 of Figure 2;

Figure 4 is an enlarged end view of the device as shown in Figure 1; and

Figure 5 is a sectional view taken on the line 5—5 of Figure 1 with parts removed.

As shown in the drawings:

The reference numeral 10 indicates generally a transverse harvester platform structure having a harvesting mechanism 11 in the form of a sickle extending along the front edge. A crop gathering reel 12 is adapted to feed crops standing in the field inwardly toward the sickle 11 so that the standing crop is severed and the severed portions drop onto the surface of the platform structure 10.

This particular windrow harvester has a transversely running conveyor 13 operable in the direction indicated by the arrow 14. This conveyor 13 is adapted to feed the cut crop laterally to a discharge end which adjoins a longitudinally running conveyor 15 adapted to carry the cut crop rearwardly and deposit it on the ground to the rear of the machine. As stated above, it is a particular object of this invention to have the cut crop dropped to the ground at a point forwardly of the rear edge of the transverse conveyor 13. In order to effect this result, the rearwardly running longitudinal conveyor 15 is terminated at 16 which is short of the rear edge 17 of the transversely running conveyor 13. The foreshortening of the longitudinally running conveyor insures a clear uncongested discharge for the cut crop. A guiding shield 18 is adapted to extend rearwardly of the platform 10, and by its curvature narrows the windrow as deposited on the ground from the longitudinal apron 15.

This windrow harvester is adapted to be trailed behind a tractor and as shown in Figure 1 has a frame structure 19 including a draw-bar hitch member 20. The tractor is not shown in these drawings inasmuch as it forms no part of the present invention, but it is obvious that the draw-bar hitch member 20 is capable of attachment to a tractor draw-bar. The platform is equipped with a plurality of structural members 21 projecting beyond the end of the longitudinally running conveyor. The rear ends of the frame structure 19 are hinged at 22 and 23 to the structural members 21 forming a part of the platform 10.

As best shown in Figures 4 and 5, the platform 10 is substantially torsionally balanced on a torque resisting tube 24 which extends the entire width of the platform 10 and is positioned approximately midway between the front and rear edges thereof. The torque tube is carried beneath the platform 10 by a plurality of depending brackets 25. These brackets 25 are each welded to longitudinally extending platform reenforcing beams 26 which are positioned at intervals across and beneath the platform 10. As shown in Figure 4, the torque tube 24 is welded, as shown at 27, entirely around its circumference within the bracket 25. At the outer or grainward end of the platform 10, the torque tube as best shown in Figure 5 is not welded to the depending brackets 25 but rather is merely journaled within the brackets. An arm member 28 separate from the longitudinal structural beams 26 and independent of the depending brackets 25 is welded to the torque tube 24 at 29. A threaded bolt 30 is welded or otherwise attached to the under side of the platform 10 at 31 and depends downwardly through a sleeve portion 32 at the outer end of the arm 28. Lock and adjusting nuts 33 and 34 are positioned beneath and above the sleeve portion 32 of the arm 28, and as they threadedly slide on the bolt 30, the arm 28 is adapted to be raised or lowered thereon. The tractor end of the windrow harvester platform is adjusted with respect to the frame structure 19, and this adjustment is for the entire platform. However, the grainward end of the platform generally tends to sag slightly, and in order to compensate for this sag, the rear of the two beam members 26 are swung downwardly by adjustment on the bolt 30 so that the forward portion of the grainward end of the platform will be raised about the torque tube 24.

A tractor power take-off is adapted to drive a rearwardly extending shaft 35 which operates a crank 36 which in turn causes reciprocation of a pitman 37 directly attached at 38 to the sickle 11. The drive shaft 35 continues rearwardly beyond the crank 36 and enters a gear box 39 which preferably has a cooperative pair of bevel gears (not shown) for causing a shaft 40 at right angles to the drive shaft 35 to be rotationally driven. This shaft 40 is mounted in suitable bearings 41 in turn mounted on the structural members 21. A pair of sprockets 42 and 43 are keyed or otherwise attached to the drive shaft 40. A fluid pump 44 is mounted on the structural members 21 of the platform 10 and has a transversely extending shaft 45 carrying a sprocket 46. A chain 47 joins the sprockets 42 and 46 and transmits the drive from the shaft 40 to the fluid pump 44. Fluid caused to be under pressure by this pump 44 is adapted to be propelled through a forwardly extending flexible conduit 48 which joins a hydraulically operated cylinder 49 having a reciprocating piston 50 slidably mounted therein. The hydraulically operated cylinder and piston 49 and 50 are best shown in Figure 4. The lower forward end of the cylinder 49 is mounted for pivotal attachment to the frame structure 19 at 51, and the outer end of the piston is pivotally mounted at 52 in an upward extension 53 of a portion of the platform 10. When fluid under pressure from the pump 44 is fed to the cylinder 49, the piston 50 is extended thus causing an upward pivotal movement of the forward end of the platform 10 about a pair of supporting wheels 54 and 55 and a buckling of the hinge connections 22 and 23 between the frame structure 19 and the platform 10.

The supporting wheel 54 is mounted between a pair of longitudinally extending beams 56 and 57 on an axle 58. The forward ends of these beams 56 and 57 are attached by welds or the like to the transversely extending beams 21 of the platform 10. The outer wheel 55 has an axle 59 carried by the longitudinally extending beam 26. These wheels are positioned slightly to the rear of the torque tube 24, but they are positioned within the confines of the front and rear edges of the platform 10. The torque tube 24 is carried by these wheels 54 and 55.

An upwardly extending arm 60 is journally supported on the driven shaft 40 and may be radially swung about the shaft 40. A sprocket 61 is keyed to a shaft 62 which in turn is journaled in the upper end of the arm 60. A chain 63 surrounds the sprockets 43 and 61 and causes drive to be transmitted from the shaft 40 upwardly to the shaft 62. An arm 64 extends forwardly from the upper end of the arm 60, and by reason of its attachment by a bolt or the like to the upright member 53, the arm 60 is fixed at a definite inclination. The outer forward end of the arm 64 supports a shaft 65 carrying a sprocket 66, and by reason of the chain 67 extending around the sprocket 66 and a small sprocket 68 keyed to the stub shaft 62, drive is imparted from the shaft 62 to the shaft 65. The crop gathering reel 12 is fixedly mounted on the shaft 65, and thereupon it is apparent that as the shaft 65 rotates so does the reel 12. It is sometimes necessary to adjust a windrow harvester reel forwardly or rearwardly for use in conjunction with different types of crops, and in order to facilitate this adjustment without effecting the drive in any way, an arcuate track 69 is provided at the end of the platform 10 in a plane with the sprocket 61. A collar 70, as best shown in Figure 1, forms part of the upper end of the arm 60 and is adapted to encircle the arcuate track 69. A plurality of spaced holes 71 is provided along the length of the forwardly extending reel supporting arm 64, and by removing a bolt 72 the arm 64 may be pushed forwardly or rearwardly, as desired, and the bolt 72 reinserted through the upright 53 and through any one of the holes 71 in the arm 64. It will be understood that a rearward movement of the arm 64 will not interfere with the tension of the chain drives 63 or 67 inasmuch as the arm 60 remains fixed in length and merely swings about the driving shaft 40 and is guided by the track 69. Holes 53' in the upright 53 permit various height adjustments.

A sprocket 73 securing its drive from the drive shaft 40 is adapted by means of a chain 74 to drive a sprocket 75. The sprocket 75 is mounted on a shaft 76, the outer end of which is provided with a manually operable clutch 77 so that the transverse and longitudinal aprons 13 and 15 respectively may be stopped during turning of the machine at the end of the field. A rope 77' projects forwardly from the clutch 77 to a point adjacent the tractor operator and upon pulling the rope the clutch disengages. Release of the rope will automatically cause a reengagement of the drive mechanism. The internal shaft 78 within the shaft 76 and operated by the clutch 77 is adapted to extend transversely and drive a roll 79. This roll 79 forms the drive for the longitudinally extending conveyor 15 and defines the discharge or rear edge thereof. As best shown in Figure 2, this shaft 78 extends beyond the roll 79 and has mounted on the end thereof a bevel gear 80 in cooperative engagement with a bevel gear 81 which in turn drives a shaft 82 supporting a sprocket 83. The bevel gears 80 and 81 are positioned within a gear casing 84 and are suspended beneath the platform 10. A second sprocket 85 is keyed or otherwise attached to a shaft 86 supporting the drive roll 87 for the discharge end of the transversely running apron 13. A chain 88 joins the sprockets 83 and 85 and transmits rotation from the shaft 78 to the shaft 86, and it is apparent that the transverse and longitudinal aprons are driven together. As shown in Figure 1, the drive chain 88 is protected by a shield 89 which has been removed in Figures 2 and 3 in order that the internal working parts may be more readily shown.

The fluid pump 44 is equipped with an actuating valve not shown. However, it is essential that this pump be capable of being operated by the operator of the tractor, and hence a forwardly extending rod member 90 having a bent portion 91 at the forward end thereof is capable, upon rotation, of effecting operation of the fluid pump valve actuator. Hence, if it is desired to raise or lower the windrow harvester platform, the tractor operator merely reaches back and takes hold of the handle or bent portion 91 of the rod 90 and rotates it in either direction depending on the direction in which he wishes the platform to be moved.

In operation the windrow harvester of this invention is pulled through a field of standing grain. The long sickle 11 cuts the grain and the reel 12 pushes it rearwardly onto the platform 10. A transversely running conveyor carries the cut grain laterally to a position where it is deposited on the rearwardly running conveyor 15. The cut grain then is discharged rearwardly onto the ground in a neat narrow windrow. The curved shield 18 aids in confining the windrow in as narrow a width as possible. The platform 10 as previously stated may be conveniently raised or lowered by the operator to effect cutting of the grain at different heights merely by directing the output of the fluid pump 44 to the desired end of the cylinder 49.

It will be seen from the foregoing description that an improved windrow harvester has been provided. Various details of construction and modifications will undoubtedly suggest themselves to those skilled in the art, and it is not intended by the disclosure to limit the invention otherwise than as necessitated by the appended claim.

What is claimed is:

A transversely disposed rectangularly shaped harvester platform including harvesting means extending across the front side thereof, a transversely disposed torsional support mounted beneath and carrying said platform, a wheel carrying each end of said torsional support, means mounting the platform on the torsional support substantially midway of the front and rear sides of the platform and in such a manner that each wheel carrying the torsional support is disposed between the front and rear sides of the platform, a transversely running conveyor apron on the platform to receive crops cut by said harvesting means, and a longitudinally running conveyor apron on the platform at one end of the transversely running conveyor apron and terminating forwardly of the rear edge of said transversely running conveyor apron, whereby the longitudinally running conveyor apron receives crops from the transversely running conveyor apron and carries them for deposit on the ground at a point rearwardly of the torsional support and forwardly of the rear side of the platform.

PAUL KANE.
MICHAEL S. SISULAK.

REFERENCES CITED

The following references are of record in the file of this patent:

UNITED STATES PATENTS

| Number | Name | Date |
|---|---|---|
| 1,241,452 | Unrein | Sept. 25, 1917 |
| 1,772,440 | Hanson | Aug. 5, 1930 |
| 2,059,205 | Buffington | Nov. 3, 1936 |
| 2,281,059 | Anderson et al. | Apr. 28, 1942 |
| 2,322,276 | Blaser | June 22, 1943 |
| 2,324,563 | Custenborder | July 20, 1943 |
| 2,328,838 | Oberlink | Sept. 7, 1943 |
| 2,336,263 | Krause | Dec. 7, 1943 |
| 2,365,387 | Briscoe | Dec. 19, 1944 |